United States Patent [19]

Rayner

[11] Patent Number: 5,031,477
[45] Date of Patent: Jul. 16, 1991

[54] MULTIPLE ACCESSORY DRIVE GEARBOX WITH ALTERNATIVE INPUTS

[75] Inventor: Clive Rayner, Coventry, England

[73] Assignee: Self-Changing Gears Limited, England

[21] Appl. No.: 551,147

[22] Filed: Jul. 11, 1990

[30] Foreign Application Priority Data

Jul. 13, 1989 [GB] United Kingdom ............... 8916117

[51] Int. Cl.⁵ .............................................. F16H 37/06
[52] U.S. Cl. ................................. 74/665 N; 74/665 Q
[58] Field of Search ............. 74/665 L, 665 N, 665 Q, 74/665 P; 475/6, 8

[56] References Cited

U.S. PATENT DOCUMENTS

| | | | |
|---|---|---|---|
| 1,397,893 | 11/1921 | Kay ..................... | 74/665 Q |
| 2,366,646 | 1/1945 | Orr ........................... | 475/8 |
| 2,757,556 | 8/1956 | Vebing ..................... | 475/6 |
| 3,748,927 | 7/1973 | Hertzog et al. .......... | 475/8 |
| 4,385,530 | 5/1983 | Holthoff ................... | 475/6 |

FOREIGN PATENT DOCUMENTS 744176  6/1980  U.S.S.R. .................................. 475/6
819670  9/1959  United Kingdom .

*Primary Examiner*—Dwight Diehl
*Attorney, Agent, or Firm*—Leydig, Voit & Mayer

[57] ABSTRACT

A gearbox to drive six accessory units from a vehicle prime mover or alternatively from an auxiliary engine. A continuously variable ratio unit in the drive line from the prime mover provides a constant speed at a first input to the power transmission gears over the operating range of the prime mover.

The auxiliary engine operates at a constant speed, driving a second input to the gearbox and by-passing the variable ratio unit to drive the accessories at the same constant speed as that provided by the prime mover.

Over-running clutches permit the change-over to drive from one power unit to the other to take place while both are in operation.

3 Claims, 4 Drawing Sheets

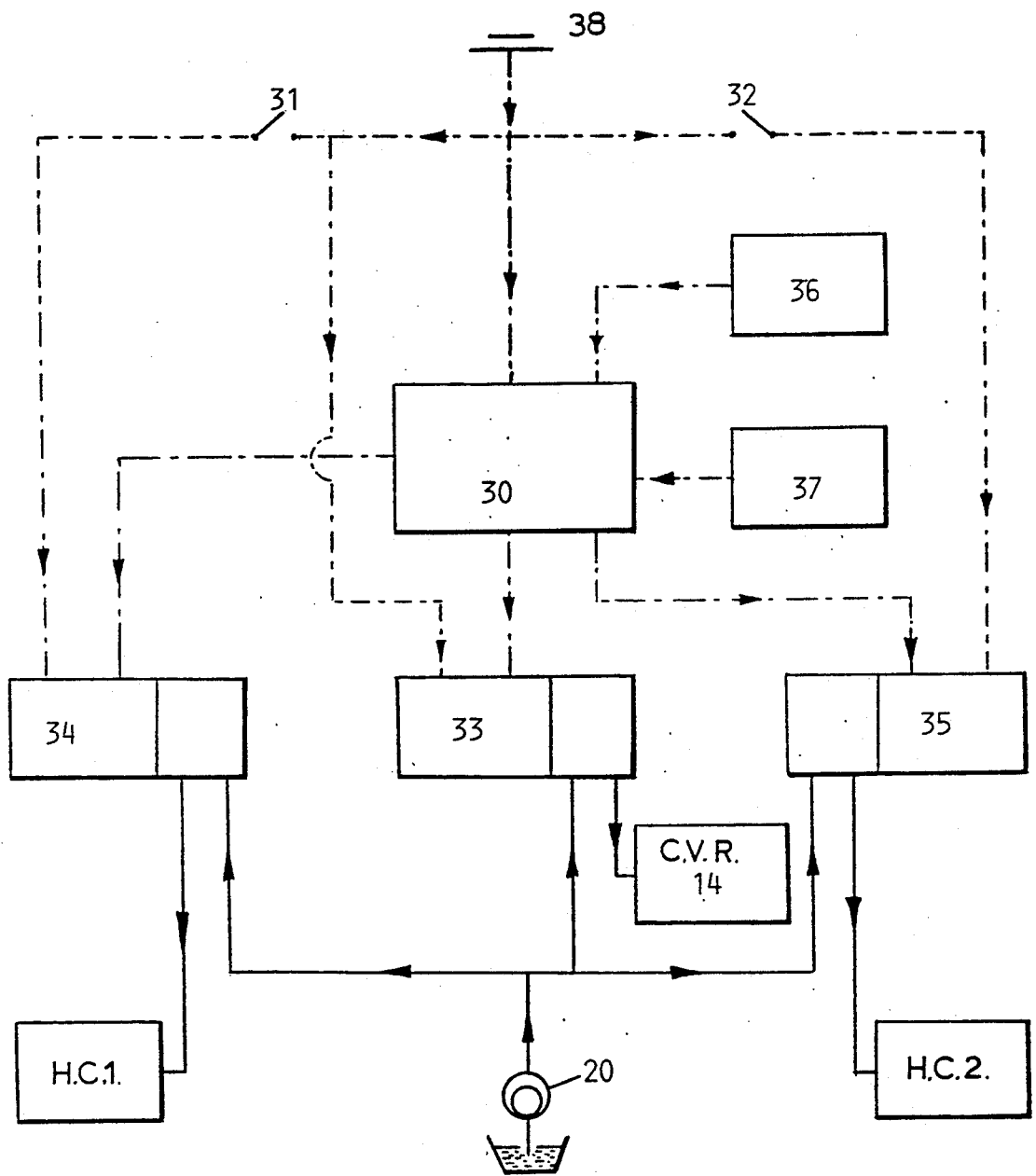
FIG.4.  ELECTRICAL CONNECTION ─ ─ ─ ─ ─
HYDRAULIC PRESSURE SUPPLY ─────

MULTIPLE ACCESSORY DRIVE GEARBOX WITH ALTERNATIVE INPUTS

This invention relates to a gearbox having a plurality of outputs to drive a number of accessory units from two alternative power source inputs.

In some vehicles, it is necessary to provide for a larger range of services than normally required by a vehicle used primarily as a means of transport. For instance, it may be required to drive accessory units such as pumps and compressors, for the supply of pressurised fluid or air to various appliances, or generators for the supply of electric power. Some of these services may be required when the vehicle propulsion unit is inoperative, and for that purpose an auxiliary power unit can be brought into use to drive the accessories.

It is an object of the present invention to provide an improved arrangement whereby power for driving a plurality of accessory units in a vehicle can be taken selectively from a vehicle propulsion power unit or an auxiliary power unit as may be required.

The invention provides a gearbox for mounting in a vehicle to transmit power from selectively operable vehicle propulsion and auxiliary power units to a plurality of vehicle accessory units which are to be driven at constant mutually different speeds from one power unit or the other, the gearbox comprising a variable ratio transmission unit arranged to transmit drive between the vehicle propulsion power unit and a first power input shaft and enabling the input shaft to be driven at a constant first rated speed throughout a range of input speeds to the transmission unit from the vehicle propulsion unit, a second power input shaft arranged to be driven at a constant second rated speed by the auxiliary power unit, a plurality of output shafts arranged to drive respective accessory units, and power transmitting means so interconnecting said input and output shafts that said output shafts are driven at the same mutually different predetermined speeds whether driven from the first input shaft running at said first rated speed or from the second input shaft running at said second rated speed, said transmitting means enabling drive from either of the first and second input shafts running at rated speed to be exchanged for the other without variation in speed of the output shafts.

The provision of the variable ratio transmission unit in the gearbox enables the first input shaft to be driven at a constant predetermined speed throughout the operating range of the unit. The auxiliary power unit can be governed to run at constant speed, and the two power inputs can therefore be operative simultaneously and synchronised to permit changeover from one to the other without change in speed or power applied to the output shafts and the accessory units.

The constant speed operation of the gearbox can enable the size of accessory units to be reduced in comparison with those which would be required under variable speed operation.

Electro-hydraulically controlled plate clutches may be used to disconnect accessory drives to reduce the load upon start-up and/or upon stopping.

Control of the variable ratio transmission unit and all other transmission functions may be handled by a microprocessor control system.

The first and second input shafts can be operatively coupled to the power transmitting means of the gearbox through over-running clutches, the clutches enabling the output shafts to be driven at their predetermined speeds by either one of the input shafts running at its rated speed whilst the other input shaft is running below its rated speed or is stationary. In a preferred arrangement, the over-running clutches are operative directly between the two input shafts and associated gears of the power transmitting means.

There now follows a detailed description, to be read with reference to the accompanying drawings, of a gearbox which illustrates the invention by way of example.

In the accompanying drawings:

FIG. 4 is a diagram showing hydraulic and electrical circuits of a control system for the gearbox.

FIG. 1 illustrates provision of a gearbox mounted in a vehicle to transmit power from selectively operable vehicle propulsion (V.P.U.) and auxiliary power (A.P.U.) units to a plurality of (viz. six) vehicle accessory units A to F. The accessory units A to F are arranged to be driven at constant mutually different speeds from one power unit or the other.

Figure 1:
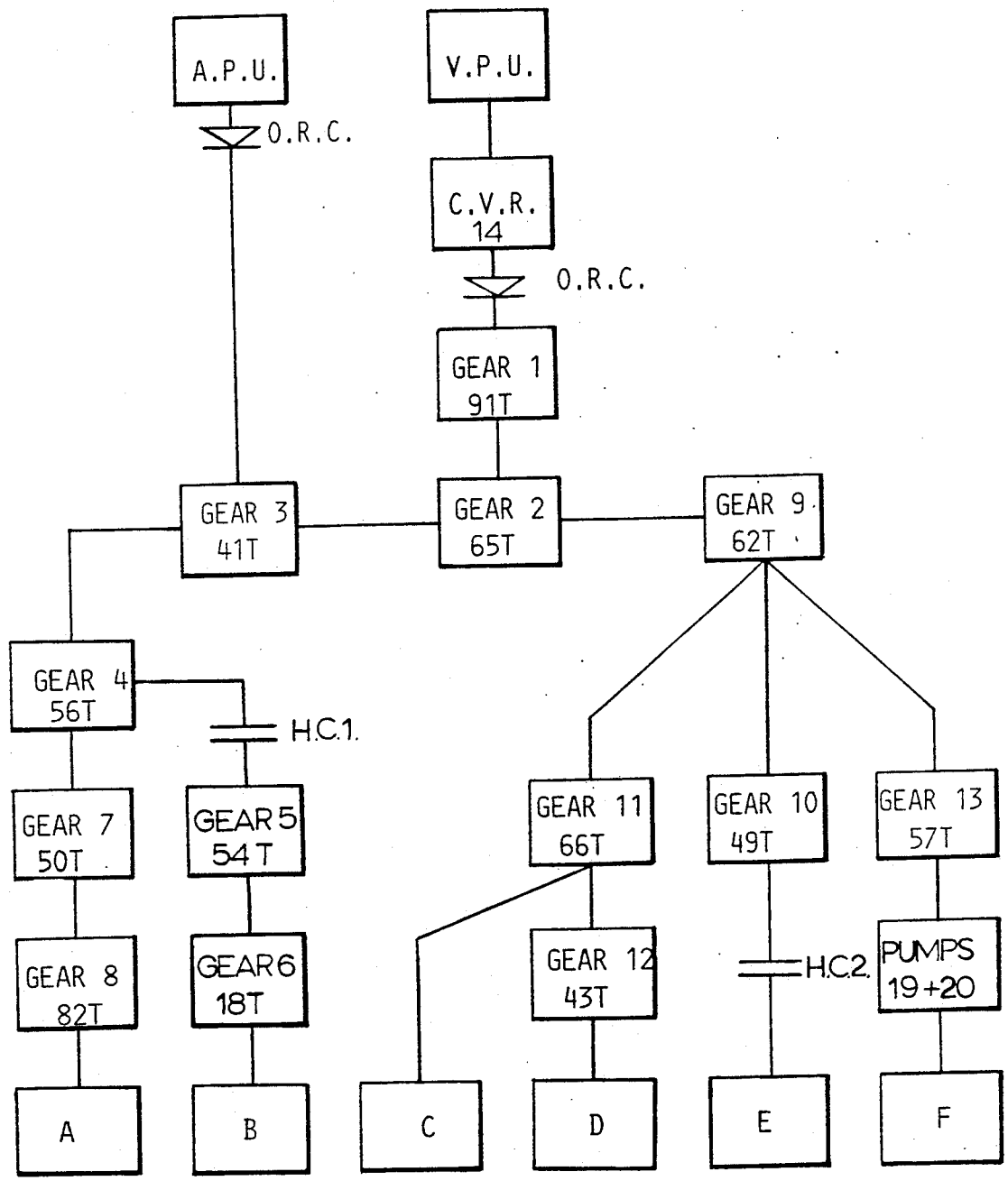
FIG. 1 is a block diagram illustrating the principal components and arrangement of the gearbox in use.
Figure 2:
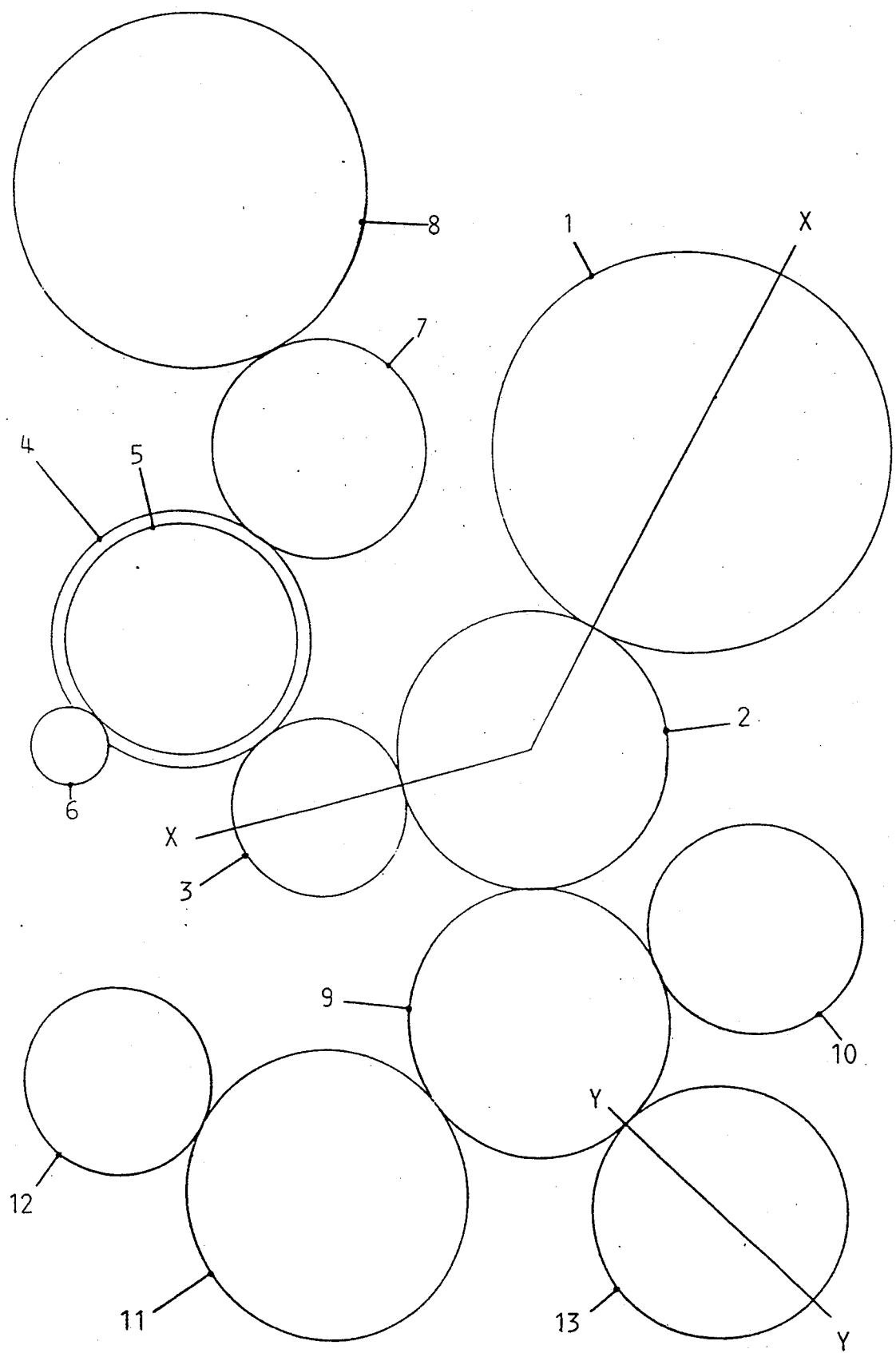
FIG. 2 is a diagrammatic representation of the configuration of gearing of the gearbox.
Figure 3:
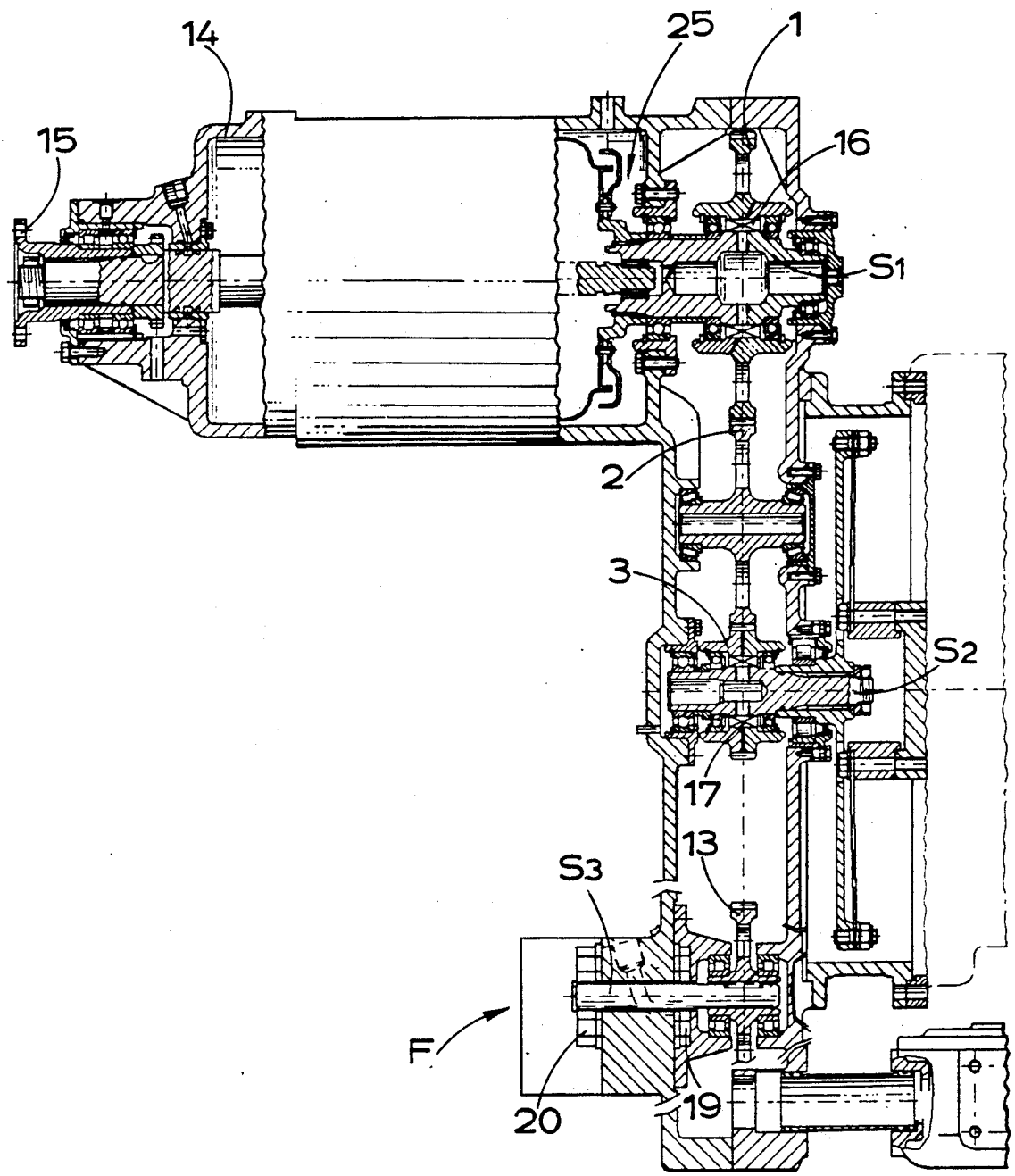
FIG. 3 is a combined sectional view through the gearbox taken on lines XX and YY of FIG. 2.

In FIGS. 1 to 3, gears of power transmitting means interconnecting input and output shafts of the gearbox are referenced respectively 1 to 13, and FIG. 1 indicates the number of teeth each gear has (e.g. gear 1 is indicated to have 91 teeth). As shown in FIG. 3, gear 1 is mounted on a first power input shaft S1 by means of a first over-running clutch 16, and gear 3 is mounted on a second power input shaft S2 by means of a second over-running clutch 17, the clutches being arranged for operative coupling of the input shafts with the power transmitting means.

The gearbox comprises a continuously variable ratio (C.V.R.) transmission unit 14 which is arranged to transmit drive between the V.P.U. and the first input shaft S1, enabling the shaft to be driven at a constant first rated speed throughout a range of input speeds to the C.V.R. unit from the V.P.U. The C.V.R unit, which is of a well known proprietory design which operates on a rolling traction drive principal, is coupled to the V.P.U. by means of an input coupling flange 15 (FIG. 3) of the unit 14. The speed ratio of the C.V.R. unit is varied by means of a hydraulic actuation system, control of the hydraulic actuation being from a microprocessor-based electronic unit, the logic of the unit receiving information from the V.P.U. in order to maintain a constant speed at a C.V.R. output coupling 25. The C.V.R. unit has a capability of a 1:1.6 speed increase through to a 2.3:1 speed reduction and can maintain a constant output speed at the coupling 25 of 2700 revolutions per minute throughout a V.P.U. speed range of 1800 rpm to 6300 rpm.

The A.P.U. is a rotary engine which is arranged to drive the second power input shaft S2 at a constant second rated speed of 6000 rpm.

The gearbox comprises six output shafts for driving the six accessory units A to F. One such shaft S3 is shown in FIG. 3, the output in this instance being used to drive two oil pumps 19 and 20; pump 19 is part of a lubricating system for the gearing and pump 20 pressurises oil for the C.V.R. unit hydraulic actuation and for two hydraulically operated clutches H.C.1 and H.C.2 associated with the outputs from gears 4 and 10 to accessories B and E respectively.

Considering the gearing illustrated by FIGS. 1 and 2, the shaft centres of the power inputs and outputs are concentric with the gears as follows:

| C.V.R. Unit output to S1 | on gear center | 1 |
|---|---|---|
| A.P.U. output to S2 | " | 3 |
| Output to Accessory A | " | 8 |
| " B | " | 6 |
| " C | " | 11 |
| " D | " | 12 |
| " E | " | 10 |
| " F | " | 13 |

The gears 1 to 13 coordinate input and output shaft speeds as follows, there being an assumed tolerance of ±1% allowable on the required speeds of accessories A, C, D, E and F and an allowable tolerance of ±1.5% on accessory B:

| V.P.U. output to C.V.R. | | 1800–6300 rpm |
|---|---|---|
| C.V.R. output to input shaft S1 | | 2700 rpm |
| A.P.U. output to input shaft S2 | | 6000 rpm |
| Output shaft to accessory | A | 3000 rpm |
| " | B | 13000 rpm |
| " | C | 3700 rpm |
| " | D | 5700 rpm |
| " | E | 5000 rpm |
| " | F | 4300 rpm |

Further considering the gearing shown in FIG. 3, the C.V.R. unit 14 is connected to the vehicle propulsion unit at the coupling flange 15. Output from the C.V.R. is to gear 1 through the first input shaft S1, this gear having the first over-running clutch 16 contained within its hub. Gear 1 drives gear 2, which is an idler gear, and this in turn drives gears 3 and 9, the latter not shown in FIG. 3. The second over-running clutch 17 is contained within the hub of gear 3, this gear being supported by bearings mounted upon the second input shaft S2. The shaft S2 is driven by the A.P.U. and the arrangement of the over-running clutches 16 and 17 enables the A.P.U. to drive the gearing when the C.V.R. unit is stationary and conversely the C.V.R. unit can drive when the A.P.U. is stationary. The arrangement also allows simultaneous operation of the two with an effective speed differential between them, and allows a changeover of drive from one to the other without affecting the speeds of the output shafts to the accessories A to F. The gear train 1,2,3 gives the gear 3 the same speed from the constant 2700 rpm of the C.V.R unit as that provided by the A.P.U. i.e. 6000 rpm, within 0.12%. Thus changeover from one power source to the other with both input shafts S1 and S2 running at their rated speeds is synchronous.

Accessories A and B have functions which are in use with either power input and are also necessary when the V.P.U. is stationary. Hence their proximity to the A.P.U. drive. The A.P.U. output gear 3 drives gear 4 and this in turn drives gears 7 and 8, the latter being the drive to accessory A. Gear 5 is driven at the same speed as gear 4 when connected to this gear by means of the clutch H.C.1. The output shaft to accessory B carries gear 6, this gear being driven by gear 5. The gear train 3,4 5 and 6 results in a high speed output to accessory B and the disconnect clutch H.C.1 is provided to enable isolation from the high inertia induced by the accessory unit during start-up and stopping.

Gear 9, driven by gear 2, drives gears 10 and 11 and 13. The output from gear 10 is to the accessory E via the hydraulically operated clutch H.C.2. This clutch is provided to isolate accessory E during start-up as in the case of accessory B.

FIG. 4 is a diagram showing hydraulic and electrical circuits for a control system. An electronic microprocessor unit 30 receives information from speed sensors 36 and 37 attached to the outputs of the V.P.U. and A.P.U.. If the V.P.U. is operative the information is processed to deliver electrical energy to the solenoid 33 which through the associated hydraulic system controls the C.V.R. unit 14 to give the correct output speed.

The microprocessor also serves to control the speed at which the clutches H.C.1 and H.C.2. can engage by delaying the completion of the circuit to the solenoids 34 or 35 after the switch 31 or 32 has been closed. The power source for the electrical system is shown at 38 and may be a storage battery or generator. The switches 31 and 32 are operated by the vehicle driver.

I claim:

1. A gearbox for mounting in a vehicle to transmit power from selectively operable vehicle propulsion and auxiliary power units to a plurality of vehicle accessory units which are to be driven at constant mutually different speeds from one power unit or the other, the gearbox comprising a variable ratio transmission unit arranged to transmit drive between the vehicle propulsion power unit and a first power input shaft and enabling the input shaft to be driven at a constant first rated speed throughout a range of input speeds to the transmission unit from the vehicle propulsion unit, a second power input shaft arranged to be driven at a constant second rated speed by the auxiliary power unit, a plurality of output shafts arranged to drive respective accessory units, and power transmitting means so interconnecting said input and output shafts that said output shafts are driven at the same mutually different predetermined speeds whether driven from the first input shaft running at said first rated speed or from the second input shaft running at said second rated speed, said transmitting means enabling drive from either of the first and second input shafts running at rated speed to be exchanged for the other without variation in speed of the output shafts.

2. A gearbox according to claim 1 in which said first and second input shafts are operatively coupled to said power transmitting means through over-running clutches of the transmitting means, said clutches enabling said output shafts to be driven at said predetermined speeds by either one of said input shafts running at its rated speed whilst the other input shaft is running below its rated speed or is stationary.

3. A gearbox according to claim 1 in which said power transmitting means comprises one or more hydraulically operated clutches whereby associated ones of said output shafts can be isolated so as to reduce the load on the input shafts during start-up.

* * * * *